United States Patent
Haruno et al.

(10) Patent No.: US 8,058,767 B2
(45) Date of Patent: Nov. 15, 2011

(54) ROTOR AND METHOD OF MANUFACTURING THE SAME AND ELECTRIC VEHICLE

(75) Inventors: Kentaro Haruno, Toyota (JP); Taketo Takeuchi, Nishio (JP); Katsumi Amano, Kitakyushu (JP); Takashi Fukumoto, Kitakyushu (JP); Kazutoshi Ueda, Kitakyushu (JP)

(73) Assignees: Toyota Jidosha Kabushiki Kaisha, Aichi-ken (JP); Mitsui High-Tec, Inc., Fukuoka-ken (JP)

( * ) Notice: Subject to any disclaimer, the term of this patent is extended or adjusted under 35 U.S.C. 154(b) by 0 days.

(21) Appl. No.: 12/282,801

(22) PCT Filed: Mar. 9, 2007

(86) PCT No.: PCT/JP2007/055318
§ 371 (c)(1),
(2), (4) Date: Sep. 12, 2008

(87) PCT Pub. No.: WO2007/105811
PCT Pub. Date: Sep. 20, 2007

(65) Prior Publication Data
US 2009/0045689 A1    Feb. 19, 2009

(30) Foreign Application Priority Data
Mar. 13, 2006 (JP) .................................. 2006-067651

(51) Int. Cl.
*H02K 1/06* (2006.01)
*H02K 21/12* (2006.01)
(52) U.S. Cl. ..... 310/216.001; 310/156.01; 310/216.004; 310/216.007; 310/216.059; 310/216.062; 310/216.065

(58) Field of Classification Search .................. 310/216, 310/156.28–156.29, 156.38–156.39, 156.53, 310/217, 216.001, 156.01, 156.56, 216.004, 310/216.007, 216.59, 216.62, 216.65
See application file for complete search history.

(56) References Cited

U.S. PATENT DOCUMENTS
4,654,736 A    3/1987    Kaczeus et al.
4,954,736 A    9/1990    Kawamoto et al.
(Continued)

FOREIGN PATENT DOCUMENTS
CN    1196597 A    10/1998
(Continued)

OTHER PUBLICATIONS
Machine Translation JP2002-034187 (2002) and JP2005-102437 (2005).*
(Continued)

*Primary Examiner* — Quyen Leung
*Assistant Examiner* — Jose A Gonzalez Quinones
(74) *Attorney, Agent, or Firm* — Sughrue Mion, PLLC (57) ABSTRACT

A rotor includes: a rotor core fixedly attached to a rotational shaft and having a magnet-inserted hole portion; a magnet inserted into the magnet-inserted hole portion; and a resin portion injected into the magnet-inserted hole portion. The rotor core is constructed by axially stacking a plurality of electromagnetic steel sheets. The electromagnetic steel sheets include: an electromagnetic steel sheet having the magnet-inserted hole portion and a weight-reducing-purpose hole portion provided separately from the magnet-inserted hole portion; and an electromagnetic steel sheet located on at least one axial end of the rotor core and having a portion covering the hole portion formed in the electromagnetic steel sheet.

15 Claims, 9 Drawing Sheets

U.S. PATENT DOCUMENTS

| | | |
|---|---|---|
| 5,199,171 A | 4/1993 | Umezawa et al. |
| 5,806,169 A | 9/1998 | Trago et al. |
| 6,031,311 A | 2/2000 | Lee |
| 6,147,428 A | 11/2000 | Takezawa et al. |
| 6,437,473 B1 | 8/2002 | Möbius et al. |
| 7,170,209 B2 * | 1/2007 | Araki et al. ............... 310/156.47 |
| 2002/0047435 A1 | 4/2002 | Takahashi et al. |
| 2002/0109429 A1 | 8/2002 | Hattori et al. |
| 2005/0104468 A1 | 5/2005 | Araki et al. |
| 2005/0140235 A1 * | 6/2005 | Yamagishi et al. ...... 310/156.53 |
| 2005/0200223 A1 | 9/2005 | Tajima et al. |
| 2007/0063607 A1 | 3/2007 | Hattori |

FOREIGN PATENT DOCUMENTS

| | | | |
|---|---|---|---|
| JP | 59035555 | | 2/1984 |
| JP | 04049825 A | * | 2/1992 |
| JP | 05083892 | | 4/1993 |
| JP | 5111225 A | | 4/1993 |
| JP | 05191936 | | 7/1993 |
| JP | 08088963 | | 4/1996 |
| JP | 8237893 A | | 9/1996 |
| JP | 08251848 | | 9/1996 |
| JP | 9215236 A | | 8/1997 |
| JP | 9-294344 A | | 11/1997 |
| JP | 10327547 A | * | 12/1998 |
| JP | 11098735 | | 4/1999 |
| JP | 2000060038 A | | 2/2000 |
| JP | 2000184645 A | * | 6/2000 |
| JP | 2001095182 A | | 4/2001 |
| JP | 2001157394 | | 6/2001 |
| JP | 2002-34187 A | | 1/2002 |
| JP | 2002034187 A | * | 1/2002 |
| JP | 2002044915 | | 2/2002 |
| JP | 2002136013 A | | 5/2002 |
| JP | 2002191144 A | | 7/2002 |
| JP | 2002-247784 A | | 8/2002 |
| JP | 2004222350 A | | 8/2004 |
| JP | 2005-51826 A | | 2/2005 |
| JP | 2005102437 A | * | 4/2005 |
| JP | 2005-312259 A | | 11/2005 |
| JP | 2006238584 A | * | 9/2006 |

OTHER PUBLICATIONS

Machine Translation JP2002-034187A (2002), JP2000-184645A (2000) and JP2006-238584A (2006).*

Machine Translation JP10327547 (1998).*

* cited by examiner

ROTOR AND METHOD OF MANUFACTURING THE SAME AND ELECTRIC VEHICLE

TECHNICAL FIELD

The present invention relates to a rotor and a method of manufacturing the same as well as an electric vehicle, and particularly to a rotor included in a rotating electric machine and a method of manufacturing the rotor as well as an electric vehicle including the rotor.

BACKGROUND ART

Japanese Patent Laying-Open No. 2002-34187 (Patent Document 1) discloses a rotor in which a resin material fills a space between a hole provided in a rotor core and a permanent magnet embedded in the hole so as to secure the permanent magnet to the rotor core.

Japanese Patent Laying-Open No. 2005-51826 (Patent Document 2) discloses a rotor of an electric rotating machine in which a plurality of permanent magnets are arranged in an outer peripheral portion of a rotor core and a pair of end plates are secured to the two axial ends of the rotor core.

It is desired to improve the drive efficiency of the rotating electric machine. Therefore, regarding the rotor as well, it is desired to reduce the weight to a maximum extent allowable in terms of strength, magnetic characteristic and the like.

In the case, however, where a hole intended to reduce the weight of the rotor core is provided in addition to magnet-inserted holes, the area of the axial end surface of the rotor core is reduced and thus a jig used for injecting a filler into the magnet-inserted holes may not be placed at an optimum position in some cases. As a result, the injection efficiency of the filler is deteriorated and accordingly the productivity of the rotor is deteriorated.

In contrast, Patent Documents 1 and 2 do not disclose a hole which is provided for reducing the weight and into which a filer is not injected. Therefore, the documents do not disclose a structure for solving the problem of deterioration in productivity of the rotor in the case where a hole is provided for the purpose of reducing the weight.

DISCLOSURE OF THE INVENTION

An object of the present invention is to provide a light-weight and high-productivity rotor and a method of manufacturing the rotor as well as an electric vehicle including the rotor.

A rotor according to the present invention includes: a rotor core fixedly attached to a rotational shaft and having a magnet-inserted hole portion; a magnet inserted into the magnet-inserted hole portion; and a filling portion injected into the magnet-inserted hole portion, the rotor core being constructed by axially stacking a plurality of sheet members, and the plurality of sheet members including: a first sheet member having a first hole portion forming the magnet-inserted hole portion and a second hole portion provided separately from the first hole portion; and a second sheet member located on at least one axial end of the rotor core and having a portion covering the second hole portion formed in the first sheet member.

In the above-described structure, the second hole portion is formed, in the sheet member forming the rotor core, separately from the first hole portion forming the magnet-inserted hole portion, and accordingly the weight of the rotor core can be reduced. As a result, the drive efficiency of a rotating electric machine including this rotor can be improved. Here, the second hole portion is covered by the second sheet member located on an axial end of the rotor core, so that the area of the axial end surface of the rotor core can be kept large. As a result, the filling material can be efficiently injected into the magnet-inserted hole portion and accordingly the productivity of the rotor is improved.

Here, regarding the rotor of the present invention, "filling portion" refers to a portion intended to secure the magnet to the rotor core, not by adhesion but chiefly by filling the inside of the hole portion.

Regarding the above-described rotor, preferably the second sheet member completely covers the second hole portion formed in the first sheet member.

Accordingly, the area of the axial end surface of the rotor core can be kept large.

Regarding the above-described rotor, preferably the second sheet member is formed on each of two axial ends of the rotor core.

Accordingly, a foreign matter can be prevented from entering the second hole portion.

Regarding the above-described rotor, preferably the filling portion includes a resin as an example. Further, regarding the above-described rotor, preferably the second hole portion is provided at a position opposite to a side surface of the magnet, the side surface being located inside in a radial direction of the rotor core. Still preferably, the filling portion is injected into the magnet-inserted hole portion from radial inside of the rotor core, relative to the magnet, and the magnet-inserted hole portion includes an extension at a portion facing a corner of the magnet, the corner being located outside in a radial direction of the rotor core.

As described above, the second hole portion is provided at a position opposite to a side surface of the magnet that is located inside in the radial direction of the rotor core, so that the diameter of the second hole portion can be made relatively large. Therefore, the reduction in weight of the rotor can be promoted. Further, the filling portion is injected into the magnet-inserted hole portion from radial inside of the rotor core relative to the magnet, so that the magnet can be pressed radially outward when the filling portion is injected. Therefore, the side surface located outward in the radial direction of the magnet and the rotor core can be allowed to uniformly contact each other. As a result, the centrifugal force acting on the magnet when the rotor is rotated can be dispersed more uniformly and transmitted to the rotor core, and thus the durability of the rotor is improved. Further, an extension facing a corner of the magnet that is located outward in the radial direction of the rotor core is provided in the magnet-inserted hole portion, and accordingly the spread of the filling portion to the extension can be helped and the strength of securing the magnet can be improved.

Regarding the above-described rotor, preferably the filling portion is injected into the magnet-inserted hole portion from an opening of the magnet-inserted hole portion. It is unnecessary to provide a special hole for injecting the filling portion and thus the rotor can be downsized. As a result, the weight of the rotor can be reduced.

A method of manufacturing a rotor according to the present invention includes the steps of: forming a plurality of sheet members including a first sheet member having a first hole portion forming a magnet-inserted hole portion and a second hole portion provided separately from the first hole portion, and a second sheet member having a portion covering the second hole portion when stacked on the first sheet member; forming a rotor core by stacking the first and second sheet members such that the second sheet member is located on at least one axial end; inserting a magnet into the magnet-inserted hole portion; and forming a filling portion by injecting a filling material into the magnet-inserted hole portion from above the second sheet member.

According to the above-described method, the second hole portion is formed in the sheet member forming the rotor core, separately from the first hole portion forming the magnet-inserted hole portion, so that the rotor core can be reduced in weight. As a result, the drive efficiency of a rotating electric machine including the rotor can be improved. Here, the second hole portion is covered with the second sheet member located on an axial end of the rotor core, so that the area of the axial end surface of the rotor core can be kept large. As a result, the degree of flexibility in positioning the apparatus when forming the filling portion is improved. As a result, the filling material can be injected efficiently into the magnet-inserted hole portion, so that the productivity of the rotor is improved.

Regarding the above-described method, preferably the filling material flows to an opening of the magnet-inserted hole portion from a position located above the second sheet member and overlapping the second hole portion.

Thus, the area of the axial end surface of the rotor core increased by the second sheet member can be effectively used.

An electric vehicle according to the present invention includes the above-described rotor or the rotor manufactured according to the above-described method of manufacturing the rotor.

In accordance with the present invention, a lightweight and high-productivity rotor and a method of manufacturing the rotor as well as an electric vehicle including the rotor can be provided.

BEST MODES FOR CARRYING OUT THE INVENTION

In the following, embodiments of the present invention will be described. Here, like or corresponding components are denoted by like reference characters and a description thereof will not be repeated in some cases.

Regarding the embodiments described below, in the case where reference is made to the number of pieces, amount or the like, the scope of the present invention is not necessarily limited to the number, amount or the like unless otherwise specified. Further, in the following embodiments, each component is not necessarily a requisite component of the present invention unless otherwise specified. Furthermore, in the case where a plurality of embodiments are provided below, it is originally intended that some features of the embodiments are appropriately combined unless otherwise specified.

Figure 1:
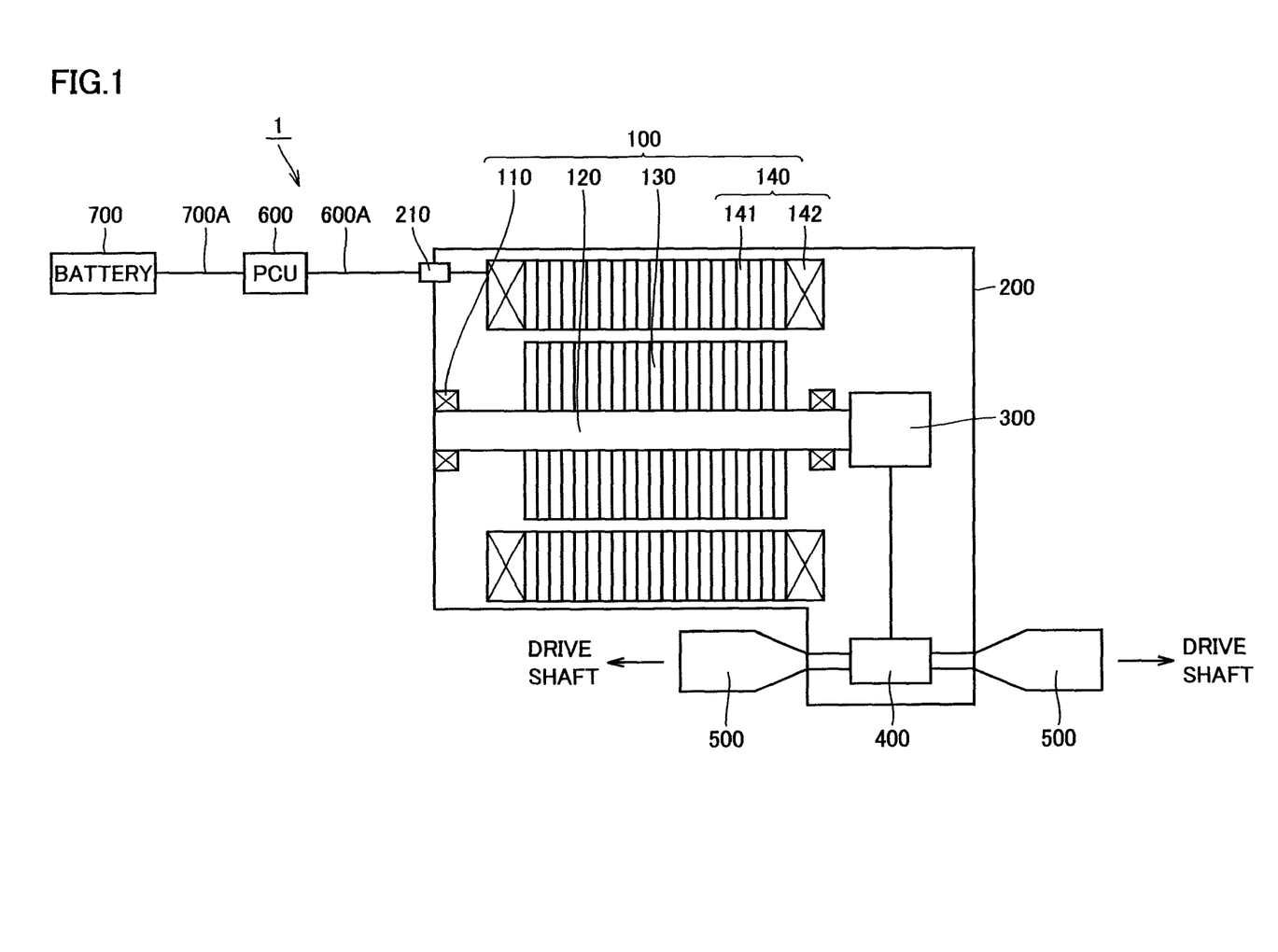
FIG. 1 is a diagram schematically showing a structure of a drive unit to which a rotor according to an embodiment of the present invention is applied.

FIG. 1 is a diagram schematically showing a structure of a drive unit to which a rotor according to an embodiment of the present invention is applied. In the example shown in FIG. 1, drive unit 1 refers to a drive unit mounted on a hybrid vehicle that is "electric vehicle" and is configured to include a motor generator 100, a housing 200, a reduction mechanism 300, a differential mechanism 400, and a driveshaft receiving portion 500.

Motor generator 100 is a rotating electric machine having the function of an electric motor or electric generator, and includes a rotational shaft 120 rotatably attached to housing 200 via a bearing 110, a rotor 130 attached to rotational shaft 120, and a stator 140. Stator 140 includes a stator core 141, and a coil 142 is wound around stator core 141. Coil 142 is electrically connected to a feed cable 600A via a terminal block 210 provided to housing 200. Feed cable 600A has another end connected to a PCU 600. PCU 600 is electrically connected to a battery 700 via a feed cable 700A. Accordingly, battery 700 and coil 142 are electrically connected.

The motive energy that is output from motor generator 100 is transmitted from reduction mechanism 300 via differential mechanism 400 to driveshaft receiving portion 500. The drive force transmitted to driveshaft receiving portion 500 is transmitted in the form of a rotational force via a driveshaft (not shown) to wheels (not shown) to cause the vehicle to run.

In contrast, when the hybrid vehicle is regeneratively braked, the wheels are rotated by an inertial force of the vehicle body. The rotational force from the wheels drives motor generator 100 via driveshaft receiving portion 500, differential mechanism 400 and reduction mechanism 300. At this time, motor generator 100 operates as an electric generator. The electric power generated by motor generator 100 is stored in battery 700 via an inverter in PCU 600.

Feed cables 600A, 700A are each a three-phase cable formed of a U phase cable, a V phase cable and a W phase cable. Coil 142 is formed of a U phase coil, a V phase coil and a W phase coil, and respective terminals of these three coils are connected to feed cables 600A, 700A that are each the three-phase cable.

The use of motor generator 100 is not limited to a hybrid vehicle (HV) and may be mounted on other "electric vehicles" (such as fuel cell vehicle and electric car for example).

Figure 2:
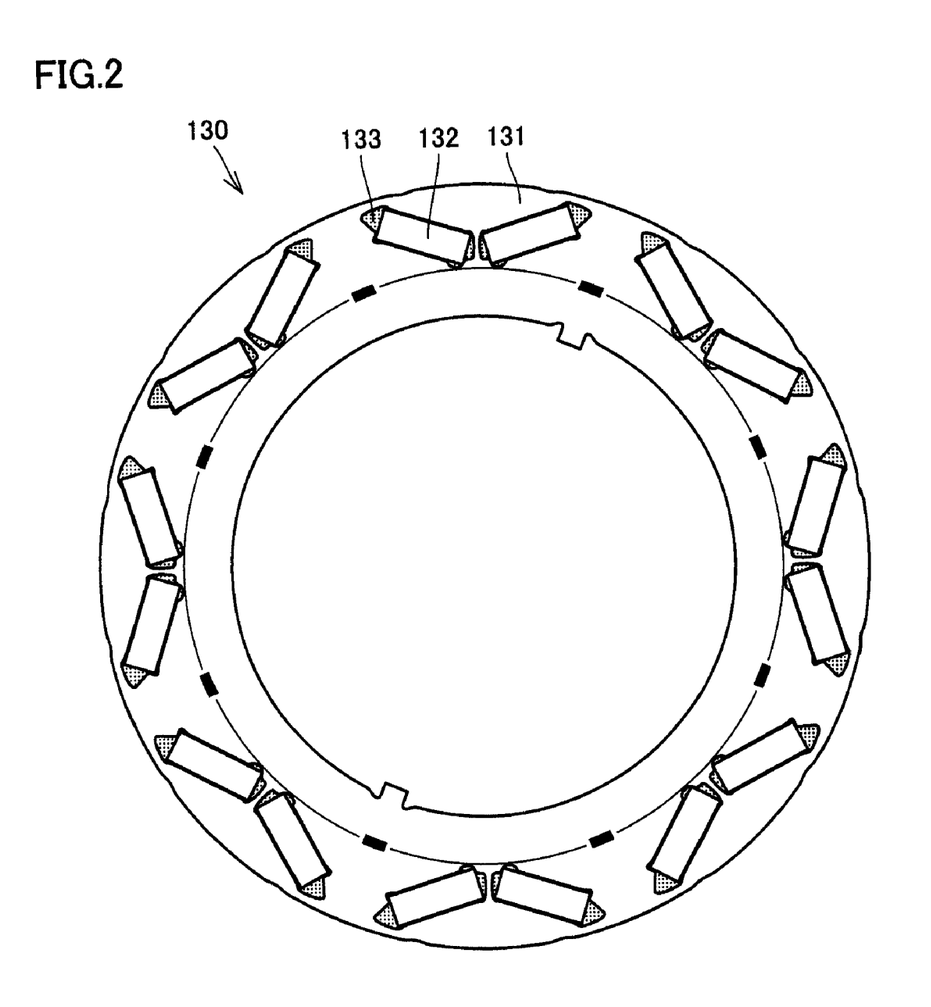
FIG. 2 is a plan view of a rotor according to an embodiment of the present invention.
Figure 3:
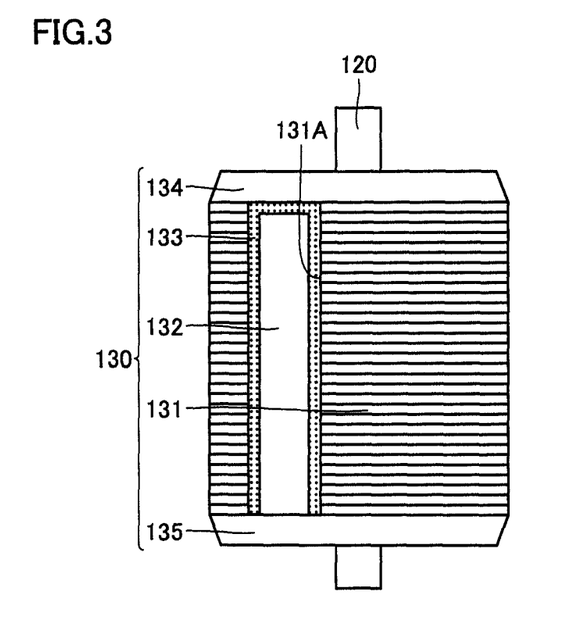
FIG. 3 is a longitudinal cross section showing a magnet-inserted portion in a rotor according to an embodiment of the present invention.

FIG. 2 is a plan view of rotor 130, and FIG. 3 is a longitudinal cross section of rotor 130. Referring to FIGS. 2 and 3, rotor 130 includes a rotor core 131 fixedly attached to rotational shaft 120 and having a hole portion 131A for inserting a magnet therein, a magnet 132 inserted into hole portion 131A to be embedded in rotor core 131, a resin portion 133 filling a clearance between the side surface of hole portion 131A and magnet 132, and end plates 134, 135 provided on axial end surfaces respectively of rotor core 131.

Resin portion 133 that is "molded resin portion" is formed including an epoxy-based resin for example. Resin portion 133 is thus provided to secure magnet 132 to rotor core 131. Resin portion 133 secures magnet 132 to rotor core 131 not by means of adhesion but chiefly by filling the inside of hole portion 131A. Therefore, the ratio of filling resin portion 133 to the space in hole portion 131A is higher than the ratio of an adhesive used as a securing material for the magnet in a similar rotor core. In this way, magnet 132 can be precisely fixed in hole portion 131A.

In order to improve the operational efficiency of "electric vehicle," it is required to improve the drive efficiency of motor generator 100. One technique for improving the drive efficiency of motor generator 100 is to reduce the weight of rotor 130. One technique for reducing the weight of rotor 130 is to provide in rotor core 131 a hole portion with the purpose of reducing the weight, in addition to hole portions 131A for inserting magnets therein.

Figure 4:
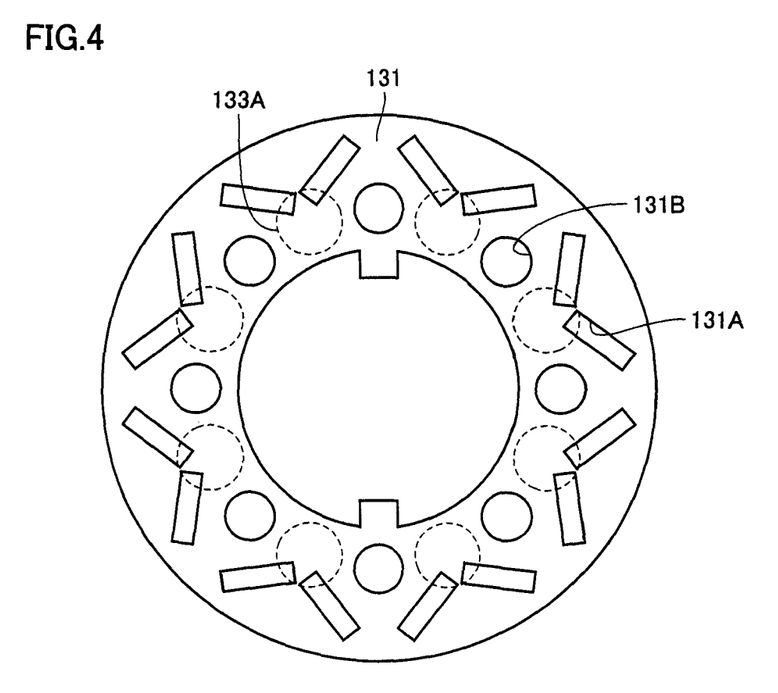
FIG. 4 is a plan view showing a relation between a resin-pot-installed portion and a weight-reducing-purpose hole portion in a rotor according to a comparative example.

FIG. 4 is a plan view showing a relation between a resin-pot-installed portion and a weight-reducing-purpose hole portion in a rotor in a comparative example. Referring to FIG. 4, weight-reducing-purpose hole portion 131B is provided in a radially inner portion relative to magnet-inserted hole portion 131A. The magnet embedded in rotor core 131 is provided near the outer periphery of rotor core 131. Therefore, on the inner periphery side of magnet-inserted hole portion 131A, there is left a relatively large region where weight-reducing-purpose hole 131B can be provided. Weight-reducing-purpose hole portion 131B is provided in this region so that rotor core 131 can be reduced in weight and the drive efficiency of motor generator 100 can be improved. In the case where hole portion 131B is provided as shown in FIG. 4, however, the area of the axial end surface of rotor core 131 is reduced and thus the degree of flexibility in positioning resin pot 133A for injecting resin portion 133 is lowered. For example, in the example of FIG. 4, when resin pot 133A is to be provided in a radially inner portion relative to hole 131A while avoiding hole portion 131B, resin pot 133A and hole portion 131A will overlap. Therefore, in the example of FIG. 4, it is difficult to provide resin pot 133A in a radially inner portion relative to hole portion 131A. Details of the structure of a resin seal apparatus including resin pot 133A will be described hereinlater.

Figure 5:
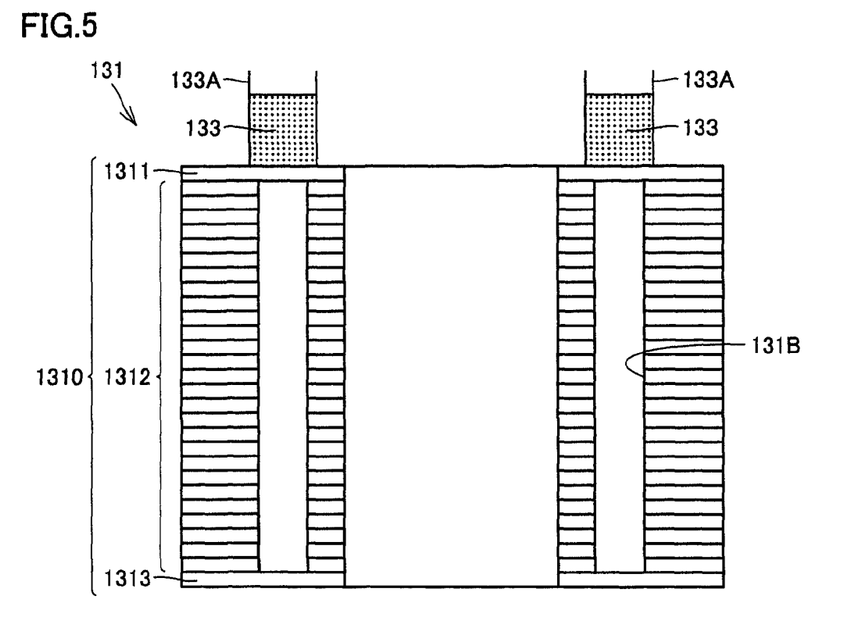
FIG. 5 is a longitudinal cross section showing a weight-reducing-purpose hole portion in a rotor according to an embodiment of the present invention.
Figure 6:
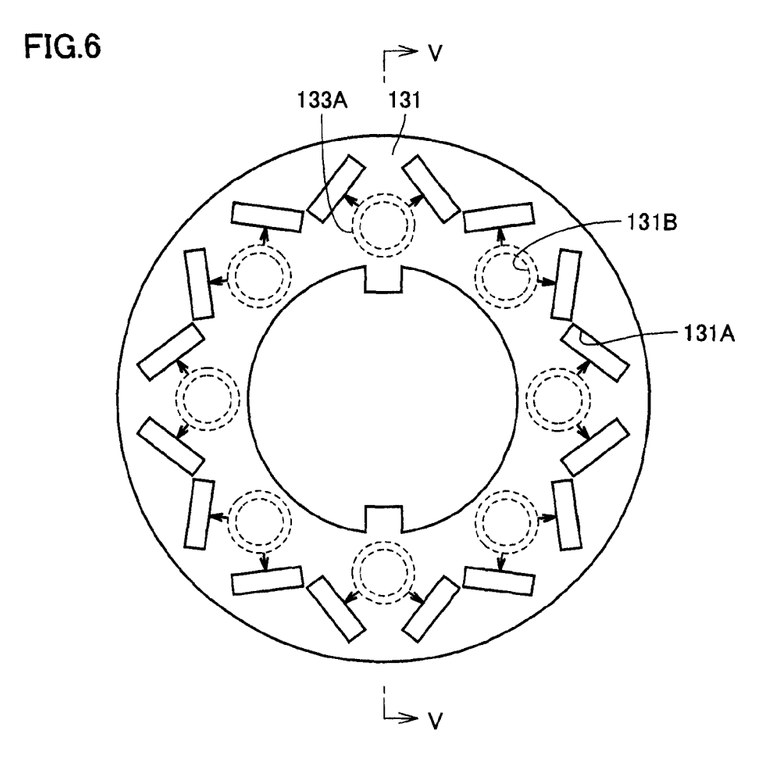
FIG. 6 is a plan view showing a relation between a resin-pot-installed portion and a weight-reducing-purpose hole portion in a rotor according to an embodiment of the present invention.

FIG. 5 is a longitudinal cross section showing weight-reducing-purpose hole portion 131B in rotor 130 according to the present embodiment. FIG. 6 is a plan view showing a relation between a resin-pot-installed portion and weight-reducing-purpose hole portion 131B in rotor 130. FIG. 5 is a diagram showing the V-V cross section in FIG. 6.

Referring to FIG. 5, in rotor 130 of the present embodiment, an electromagnetic steel sheet 1310 forming rotor core 131 includes an electromagnetic steel sheet 1311 located on one axial end of rotor core 131, an electromagnetic steel sheet 1312 located in a region including an axially central portion of rotor core 131, and an electromagnetic steel sheet 1313 located on the other axial end of rotor core 131. Here, hole portion 131B is not formed in electromagnetic steel sheets 1311, 1313 located on respective axial ends of rotor core 131. Electromagnetic steel sheets 1311, 1313 are provided to cover hole portion 131B formed in the laminate structure of electromagnetic steel sheet 1312. In this way, resin pot 133A can be provided on a region overlapping hole portion 131B as seen in the axial direction of rotor core 131.

As shown in FIG. 6, weight-reducing-purpose hole portion 131B and resin pot 133A are provided at a position opposite to a side surface on the radially inner side of magnet-inserted hole portion 131A. A resin material supplied from one resin pot 133A flows in the directions indicated by the arrows in FIG. 6, in a resin path in the resin seal apparatus described hereinlater, to reach two hole portions 131A. Thus, from one resin pot 133A, the resin material is injected simultaneously into a plurality of hole portions 131A, so that the productivity can be improved.

Figure 7:
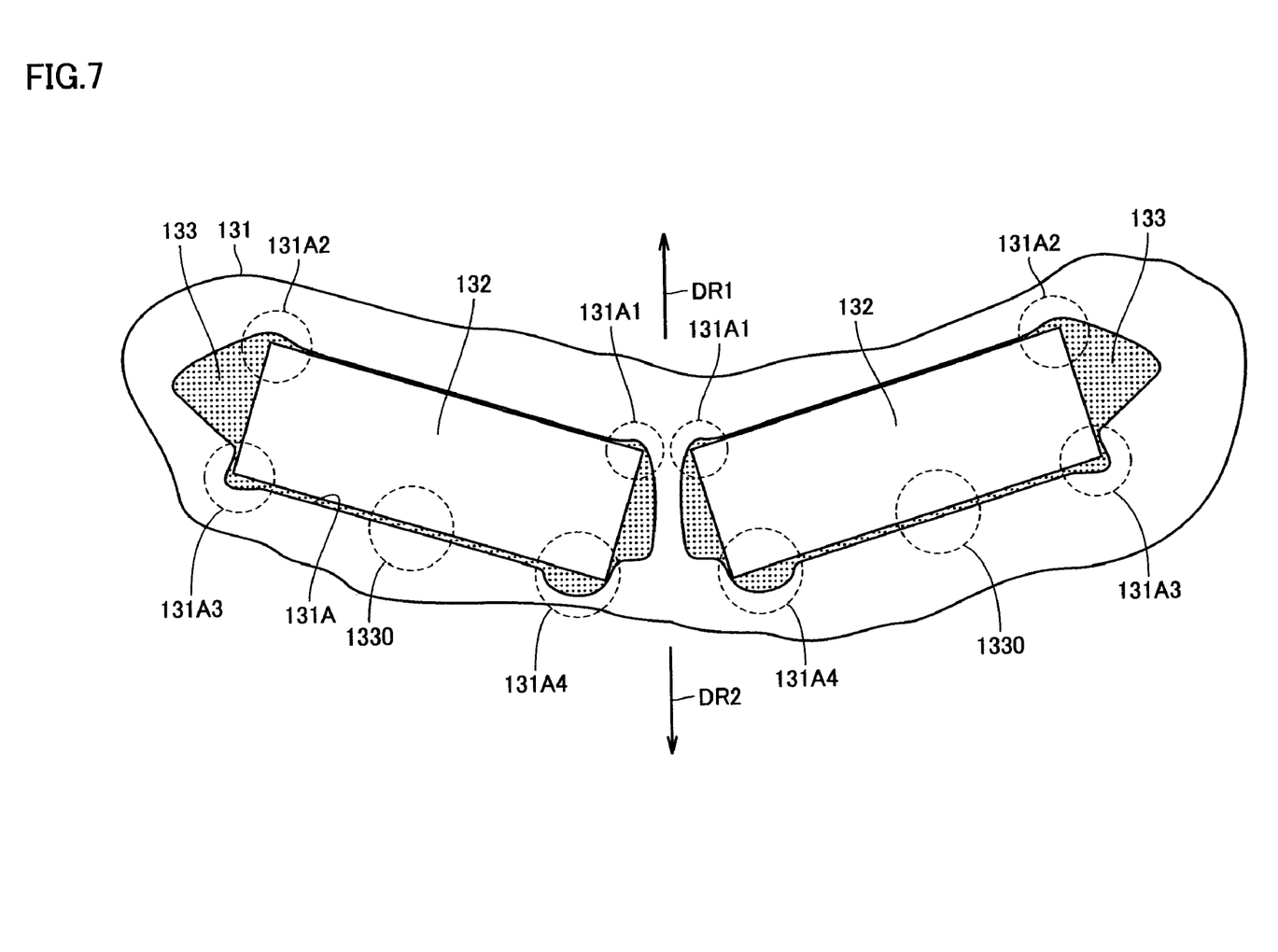
FIG. 7 is an enlarged view showing a magnet-inserted portion and therearound in a rotor according to an embodiment of the present invention.

FIG. 7 is an enlarged view showing a magnet-inserted portion and therearound in the rotor. Referring to FIG. 7, resin portion 133 is injected into magnet-inserted hole portion 131A from a portion (gate 1330) facing a central part of a side of the magnet that is located inside in the radial direction of rotor core 131, in the opening of hole portion 131A.

There is a clearance between hole portion 131A and magnet 132. In the case for example where an adhesive is used to secure magnet 132, movement of magnet 132 in hole portion 131A cannot be controlled and accordingly difference between respective positions in the radial direction of magnets 132 occurs (namely the precision in balance is deteriorated). Further, in the case where magnets 132 are dominantly located inside in the radial direction in respective hole portions 131A, magnets 132 could be bent, depending on the ratio of the filling adhesive, due to a centrifugal force acting when the rotor is rotated, resulting in a local large stress on rotor core 131. In contrast, resin portion 133 is injected as described above from gate 1330 located at the central part of the magnet that is located inside in the radial direction of rotor core 131, and thus magnet 132 can be stably pressed outward in the radial direction of rotor core 131 when the resin is injected and accordingly the above-described problem can be solved.

Further, resin portion 133 is poured from an opening of hole portion 131A into hole portion 131A without providing a special hole for injecting the resin therefrom. Accordingly, rotor 130 can be downsized.

Hole portion 131A includes outer extensions 131A1, 131A2 each in a portion facing a corner of magnet 132 that is located outward in the radial direction (the direction of an arrow DR1), for the purpose of helping the spread of resin portion 133, and includes inner extensions 131A3, 131A4 each in a portion facing a corner of magnet 132 that is located inward in the radial direction (the direction of an arrow DR2), for the purpose of helping the spread of resin portion 133.

In the case as described above where resin portion 133 is injected from inside in the radial direction of magnet 132, the resin spreads most hard around the outer corners in the radial direction of the magnet. Here, outer extensions 131A1, 131A2 are provided at the corners, so that the spread of resin portion 133 can be efficiently helped without providing a hole for injecting the resin in addition to hole portion 131A.

Figure 8:
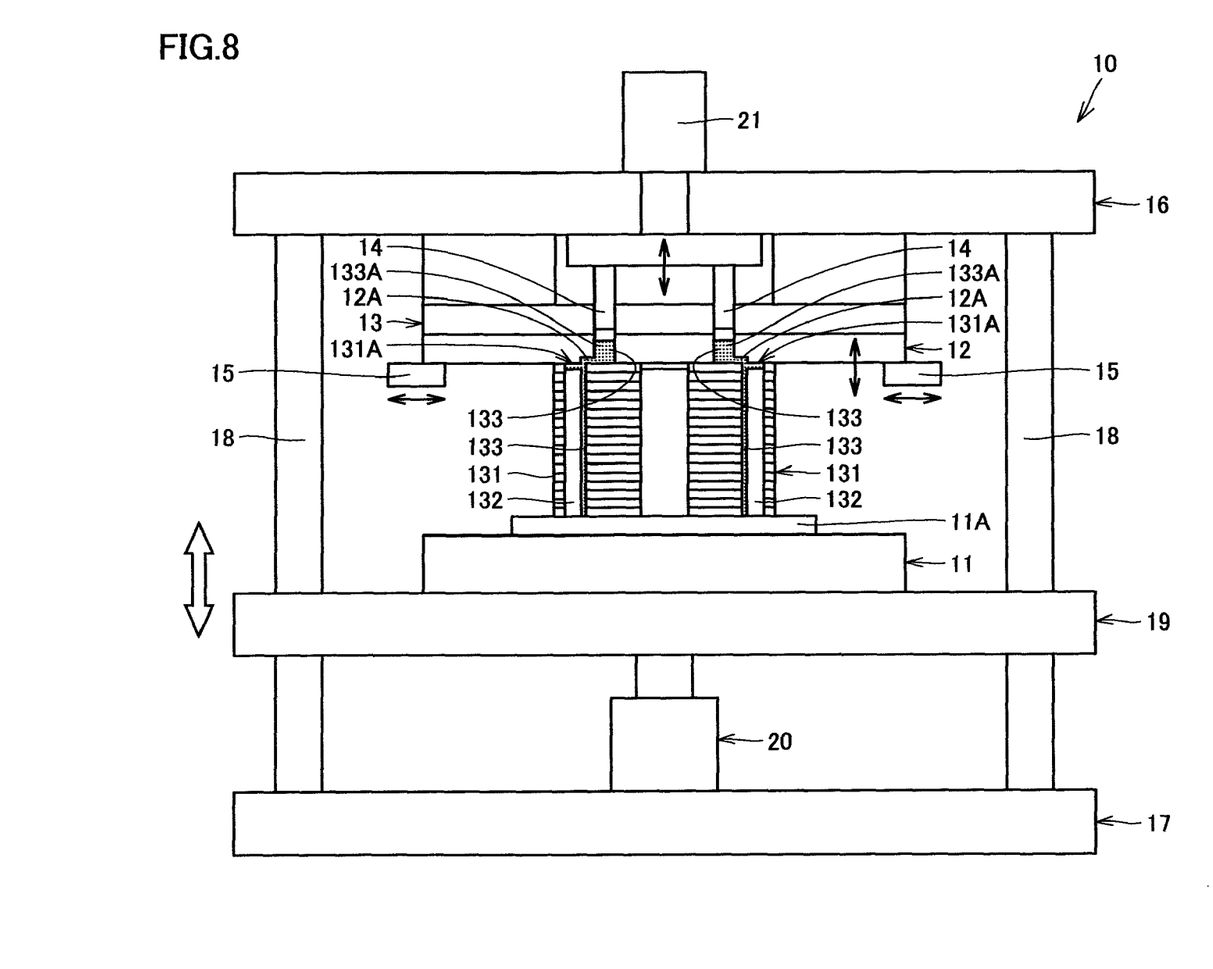
FIG. 8 shows a resin seal apparatus for forming a resin portion in a rotor according to an embodiment of the present invention.

FIG. 8 is a diagram showing a resin seal apparatus for forming resin portion 133 in rotor 130. Referring to FIG. 8, resin seal apparatus 10 is configured to include a lower mold 11 on which a carry tray 11A with rotor core 131 placed thereon is mounted and which is configured to be capable of ascending and descending, and an upper mold 12 placed on rotor core 131 and configured to ascend as lower mold 11 ascends. Upper mold 12 includes, in a region located inside in the radial direction relative to hole portion 131A of rotor core

131, a plurality of resin pots 133A containing a material (referred to as tablet in some cases) for resin portion 133, and includes, in its bottom portion, a resin path 12A (referred to as runner in some cases) directing a molten liquid resin material to hole portion 131A. Resin seal apparatus 10 further includes a fixed base 13 fixedly placed so that a gap serving as a working space for inserting a resin material forming resin portion 133 is formed relative to upper mold 12 located at its lower limit position, a plurality of plungers 14 passing through fixed base 13 for pressurizing the resin material fed into resin pot 133A of ascended upper mold 12, and a stopper 15 holding ascending upper mold 12 at its upper limit position. Fixed base 13 is attached to an upper fixed plate 16, while lower mold 11 is mounted on an ascending/descending plate 19 that moves up and down along four guide posts 18 coupling upper fixed plate 16 and a lower fixed plate 17. In fixed base 13, heating means (not shown) is provided to heat plunger 14 in advance and thereby facilitate extrusion of the resin material, and nullify a difference in thermal expansion between fixed base 13 and upper mold 12 and thereby eliminate displacement of the abutment between plunger 14 and resin pot 133A. Ascending/descending plate 19 is configured to be ascended and descended by a lower mold ascending/descending means 20 (jack for example) provided to lower fixed plate 17. A plurality of plungers 14 inserted into respective resin pots 133A are configured to ascend and descend in resin pot 133A at the same timing by plunger drive means 21 provided to upper fixed plate 16.

Figure 9:
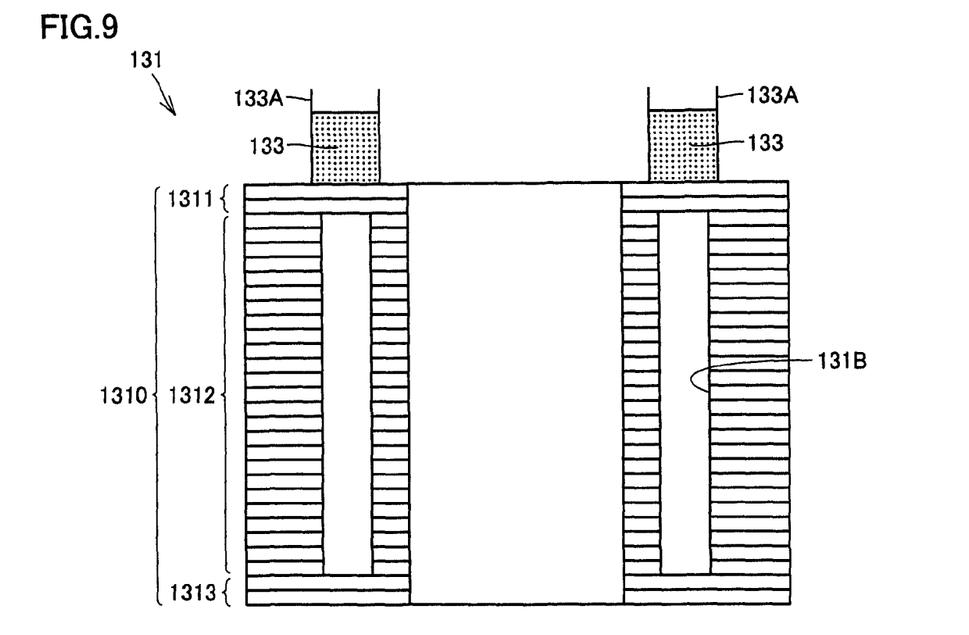
FIG. 9 is a longitudinal cross section showing a weight-reducing-purpose hole portion in a modification of a rotor according to an embodiment of the present invention.
Figure 10:
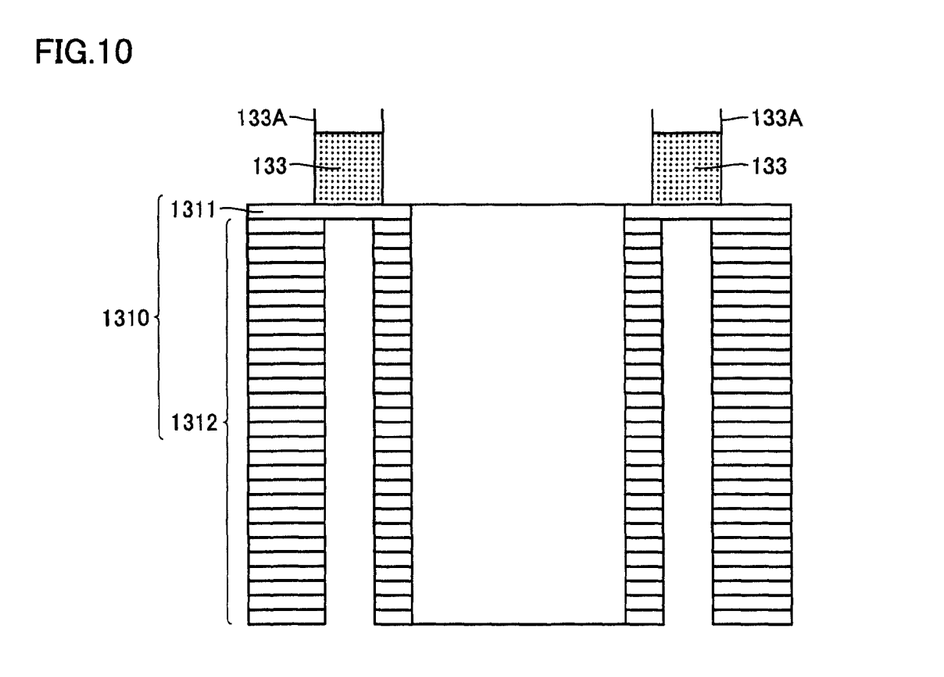
FIG. 10 is a longitudinal cross section showing a weight-reducing-purpose hole portion in another modification of the rotor according to an embodiment of the present invention.

FIGS. 9 and 10 are each a longitudinal cross section showing a weight-reducing-purpose hole portion in a modification of rotor 130 according to the present embodiment.

Referring to FIG. 9, regarding electromagnetic steel sheets 1311, 1313 without hole portion 131B, a plurality of electromagnetic steel sheets 1311 and a plurality of electromagnetic steel sheets 1313 may be provided on axial ends of rotor core 131. Referring to FIG. 10, electromagnetic steel sheet 1313 may not be provided. In other words, electromagnetic steel sheet 1311 without hole portion 131B may be provided on only one axial end of rotor core 131.

Figure 11:
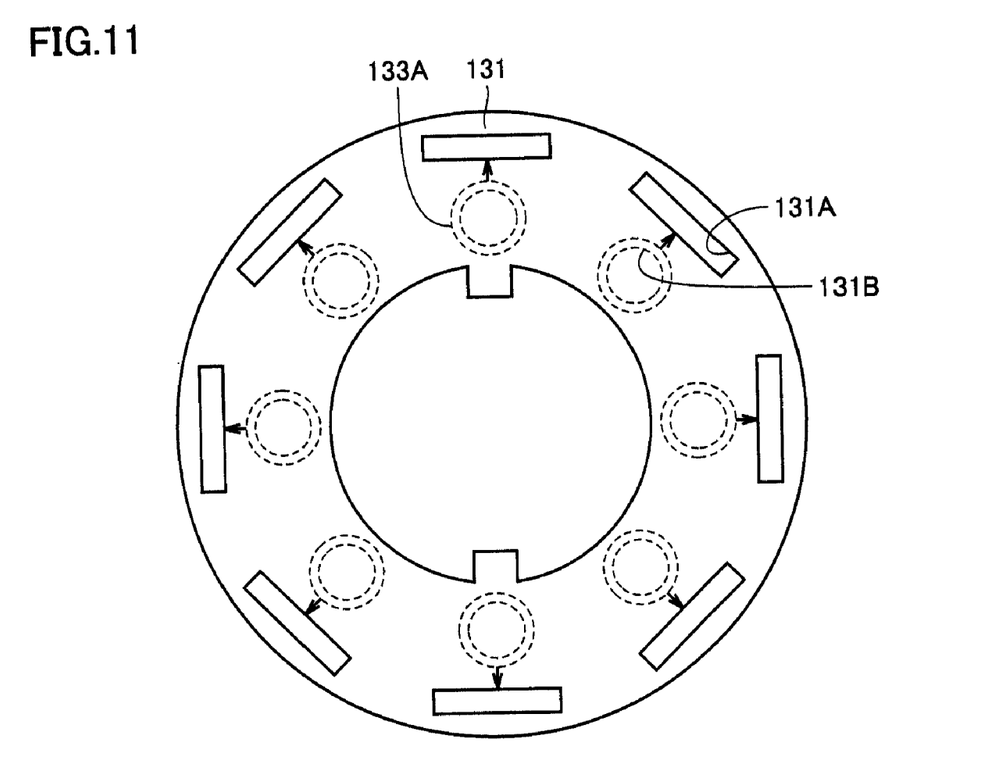
FIG. 11 is a plan view showing still another modification of the rotor according to an embodiment of the present invention.

FIG. 11 is a plan view showing still another modification of rotor 130 according to the present embodiment. In the above-described example, two magnet-inserted hole portions 131A are arranged to substantially form a V shape. The arrangement of hole portions 131A is not limited to the above-described one. As shown in FIG. 11, hole portion 131A may be provided so that the direction of the width of each hole portion 131A is coincident with the radial direction of rotor core 131.

According to the above-described rotor and a method of manufacturing the rotor, hole portion 131B is formed separately from magnet-inserted hole portion 131A in electromagnetic steel sheets 1312 forming rotor core 131, and accordingly rotor core 131 can be reduced in weight. As a result, the drive efficiency of motor generator 100 including rotor 130 can be improved. Here, electromagnetic steel sheet 1311 located on an axial end of rotor core 131 covers hole portion 131B so that the area of the axial end surface of rotor core 131 can be kept large. As a result, the degree of flexibility in positioning resin pot 133A for forming resin portion 133 is improved. Therefore, the resin material can be simultaneously injected into a plurality of holes 131A and an optimum flow of the injected resin material can be implemented. As a result, the resin can be efficiently injected into hole portion 131A, and accordingly the productivity of rotor 130 is improved.

Further, according to the above-described rotor and a method of manufacturing the rotor, the area of electromagnetic steel sheet 1311 where resin pot 133A is provided is increased so that the stress concentration near the hole portion can be alleviated and deformation of rotor core 131 can be suppressed.

Furthermore, according to the above-described rotor and a method of manufacturing the rotor, hole portion 131B is covered by electromagnetic steel sheet 1311, and accordingly a foreign matter can be prevented from entering the inside of hole portion 131B.

Moreover, according to the above-described rotor and a method of manufacturing the rotor, the resin material forming resin portion 133 is injected from the inside in the radial direction of rotor core 131 relative to magnet 132 into hole portion 131A, so that magnet 132 can be pressed outward in the radial direction of rotor core 131 when the resin material is injected. Therefore, the side surface located outward in the radial direction of magnet 132 and rotor core 131 can be allowed to uniformly contact each other. As a result, the centrifugal force acting on magnet 132 when the rotor is rotated can be dispersed more uniformly and transmitted to rotor core 131, and thus the durability of rotor 130 is improved. Further, as described above, outer extensions 131A1, 131A2 each facing a corner of the magnet that is located outward in the radial direction of rotor core 131 are provided, and accordingly the spread of the resin material to the extensions can be helped and the strength of fixing magnet 132 can be improved.

In the description above, the example where electromagnetic steel sheets 1311, 1313 completely cover hole portion 131B is explained. Alternatively, electromagnetic steel sheets 1311, 1313 may be configured to partially cover hole portion 131B. In constructing the above-described rotor, the portion of electromagnetic steel sheets 1311, 1313 that covers hole portion 131B may be provided in the following manner. Specifically, no hole may be originally formed in the portion, or a hole may be once formed in the portion and thereafter the hole may be backfilled.

A summary of the above-described structure is as follows. A rotor according to the present embodiment includes rotor core 131 fixedly attached to rotational shaft 120 and having hole portion 131A that is "magnet-inserted hole portion," magnet 132 inserted into hole portion 131A, and resin portion 133 that is "filling portion" injected into hole portion 131A. Here, rotor core 131 is constructed by axially stacking a plurality of electromagnetic steel sheets 1310 that are "sheet members." Electromagnetic steel sheets 1310 include electromagnetic steel sheet 1312 that is "first sheet member" having hole portion 131A that is "first hole portion" and hole portion 131B that is "second hole portion" provided separately from hole portion 131A, and electromagnetic steel sheets 1311, 1313 that are "second sheet members" having a portion covering hole portion 131B formed in electromagnetic steel sheet 1312.

Figure 12:
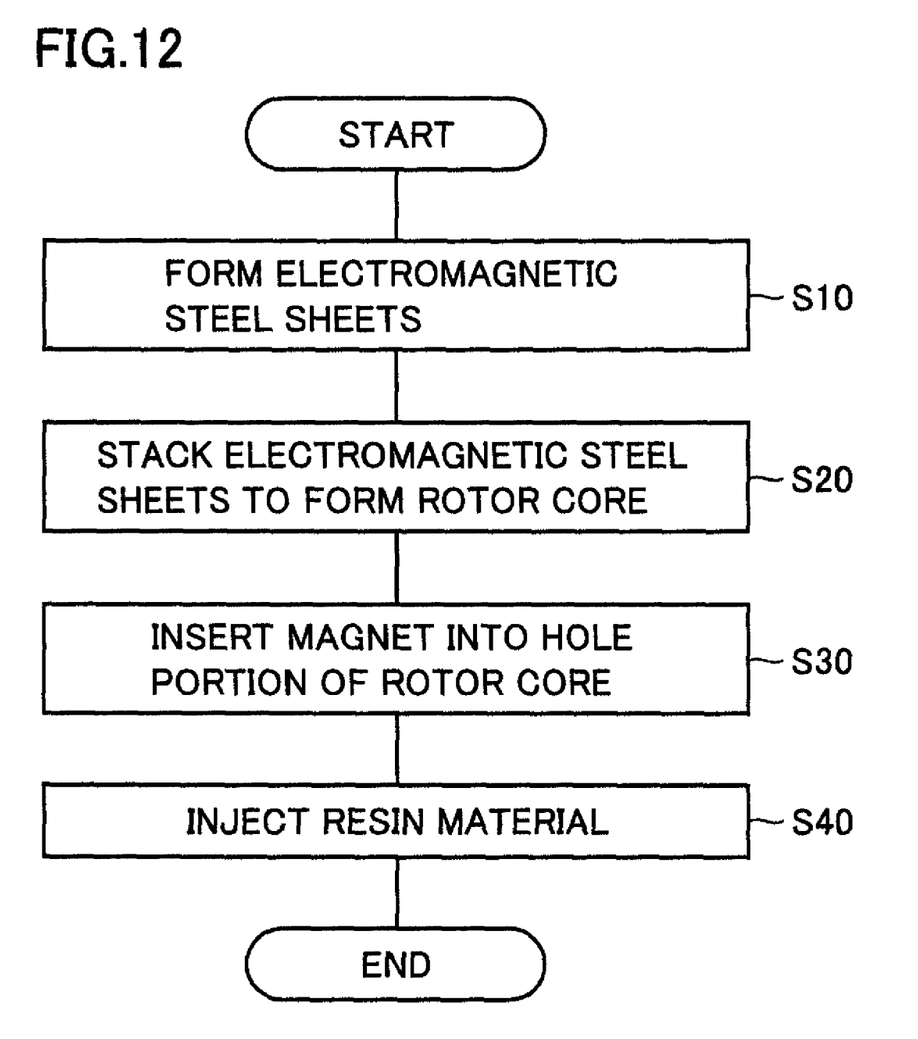
FIG. 12 is a flowchart illustrating a method of manufacturing a rotor according to an embodiment of the present invention.

A method of manufacturing a rotor according to the present embodiment includes, as shown in FIG. 12, the step (S10) of forming a plurality of electromagnetic steel sheets 1310 that are "sheet members" including electromagnetic steel sheet 1312 that is "first sheet member" having hole portion 131A that is "first hole portion" and hole 131B that is "second hole portion" provided separately from hole portion 131A, and electromagnetic steel sheets 1311, 1313 that are "second sheet members" having a portion covering hole portion 131B when stacked on electromagnetic steel sheet 1312; the step (S20) of forming rotor core 131 by stacking electromagnetic steel sheets 1311-1313 such that electromagnetic steel sheets 1311, 1313 are each located on at least one axial end; the step (S30) of inserting magnet 132 into hole portion 131A that is "magnet-inserted hole portion," and the step (S40) of forming resin portion 133 that is "filling portion" by injecting a resin material that is "filling material" into hole portion 131A from above electromagnetic steel sheet 1311 (or electromagnetic steel sheet 1313). In the example of FIG. 6, the resin material flows toward an opening of hole portion 131A from a portion located above electromagnetic steel sheet 1311 and overlapping hole portion 131B.

While embodiments of the present invention have been described, it should be construed that embodiments disclosed above are by way of illustration in all respects, not by way of limitation. It is intended that the scope of the present invention is defined by claims, and includes all modifications and variations equivalent in meaning and scope to the claims.

INDUSTRIAL APPLICABILITY

The present invention is applicable to a rotor, a method of manufacturing the rotor and an electric vehicle for example.

The invention claimed is:

1. A rotor comprising:
a rotor core fixedly attached to a rotational shaft and having a magnet-insertion hole portion;
a magnet inserted into said magnet-insertion hole portion; and
a filling material injected into said magnet-inserted hole portion,
said rotor core being constructed by axially stacking a plurality of sheet members, and
said plurality of sheet members including: a first sheet member having a first hole portion forming said magnet-insertion hole portion and a second hole portion entirely separated from said first hole portion; and a second sheet member located on at least one axial end of said rotor core and having a portion covering said second hole portion formed in said first sheet member,
wherein said second sheet member includes an opening communicating with said first hole portion to form said magnet-insertion hole portion.

2. The rotor according to claim 1, wherein said second sheet member completely covers said second hole portion formed in said first sheet member.

3. The rotor according to claim 1, wherein said second sheet member is formed on each of two axial ends of said rotor core.

4. The rotor according to claim 1, wherein said filling material includes a resin.

5. The rotor according to claim 1, wherein said second hole portion is provided at a position opposite to a side surface of said magnet, said side surface being located inside in a radial direction of said rotor core.

6. The rotor according to claim 1, wherein said filling material is injected into said magnet-insertion hole portion radially inside of said rotor core, relative to said magnet, and said magnet-insertion hole portion includes an extension at a portion facing a corner of said magnet, said corner being located outside in a radial direction of said rotor core.

7. The rotor according to claim 1, wherein said filling material is injected into said magnet-insertion hole portion from an opening of said magnet-insertion hole portion.

8. An electric vehicle comprising the rotor as recited in claim 1.

9. A method of manufacturing a rotor comprising the steps of:
forming a plurality of sheet members including a first sheet member having a first hole portion forming a magnet-insertion hole portion and a second hole portion entirely separated from said first hole portion, and a second sheet member having a portion covering said second hole portion when stacked on said first sheet member and an opening communicating with said first hole portion to form said magnet-insertion hole portion;
forming a rotor core by stacking said first and second sheet members such that said second sheet member is located on at least one axial end;
inserting a magnet into said magnet-insertion hole portion; and
forming a filling portion by injecting a filling material into said magnet-insertion hole portion from above said second sheet member.

10. The method of manufacturing the rotor according to claim 9, wherein said filling material flows to an opening of said magnet-insertion hole portion from a position located above said second sheet member and overlapping said second hole portion.

11. The rotor according to claim 1, wherein said second hole portion extends entirely through said first sheet member from a first axial end to a second axial end thereof 12. The rotor according to claim 1, wherein said first hole portion is located at an outer periphery of said rotor core and said second hole portion is located at an inner periphery of said rotor core in a radial direction of said rotor core.

13. The method of manufacturing the rotor according to claim 9, further comprising forming said second hole portion to extend entirely through said first sheet member from a first axial end to a second axial end thereof.

14. The method of manufacturing the rotor according to claim 9, further comprising forming said first hole portion at an outer periphery of said rotor core and forming said second hole portion at an inner periphery of said rotor core in a radial direction of said rotor core.

15. An electric vehicle comprising a rotor manufactured according to the method of manufacturing a rotor as recited in claim 9.

* * * * *